United States Patent [19]

Mitchell

[11] Patent Number: 4,532,867

[45] Date of Patent: Aug. 6, 1985

[54] DUAL FIELD-OF-VIEW OPTICAL TARGET DETECTOR

[75] Inventor: Robert R. Mitchell, Huntsville, Ala.

[73] Assignee: The United States of America as represented by the Secretary of the Army, Washington, D.C.

[21] Appl. No.: 511,602

[22] Filed: Jul. 7, 1983

[51] Int. Cl.³ .............................................. F42C 13/02
[52] U.S. Cl. ..................................................... 102/213
[58] Field of Search .......................................... 102/213

[56] References Cited

U.S. PATENT DOCUMENTS

| | | | |
|---|---|---|---|
| 2,137,598 | 11/1938 | Vos | 102/29 |
| 3,786,757 | 1/1974 | Goldstein et al. | 102/213 |
| 3,946,674 | 3/1976 | Pettersson et al. | 102/70.2 P |
| 4,098,191 | 7/1978 | Bagwell et al. | 102/213 |

FOREIGN PATENT DOCUMENTS

| | | | |
|---|---|---|---|
| 2458823 | 2/1981 | France | 102/213 |
| 2063430 | 6/1981 | United Kingdom | 102/214 |
| 1598064 | 9/1981 | United Kingdom | 102/213 |

*Primary Examiner*—Charles T. Jordan
*Attorney, Agent, or Firm*—Anthony T. Lane; Robert P. Gibson; Freddie M. Bush

[57] ABSTRACT

Dual field-of-view detection allows reflected energy from a target to be received in one detector and extraneous reflected energy adjacent to the target area to be simultaneously detected in a separate detector. Comparison of the desired signal with a threshold level and with the detected extraneous energy level allows superior false alarm rejection while improving sensitivity by allowing reduced threshold levels for the true target. This dual detection in a single receiver allows the receiver to have two separate but immediately adjacent fields-of-view which interact with a transmitted beam to form a pair of adjacent sensing zones. A vehicle such as a missile equipped with this detection system can pass in close proximity to a target and distinguish a true target passing through the established sensing zone from extraneous background signals.

6 Claims, 3 Drawing Figures

DUAL FIELD-OF-VIEW OPTICAL TARGET DETECTOR

DEDICATORY CLAUSE

The invention described herein may be manufactured, used, and licensed by or for the Government for governmental purposes without the payment to me of any royalties thereon.

BACKGROUND OF THE INVENTION

As improved forms of protection for military targets develop, the location of a projectile or missile relative to a target becomes more significant in effective destruction of the target. Where the target is an armored vehicle, for example, the roof of the vehicle is usually the most vulnerable. Antitank missiles are designed to pass immediately over the top of armored vehicles. These missiles carry a downward firing warhead designed to penetrate the top surfaces of the target. Thus, a sensor is required which can detect the presence of a target beneath the missile and trigger the warhead at the correct moment.

No single sensor has reliably performed this task. Therefore, most concepts rely on dual sensor combinations such as magnetic-optical, microwave-optical, or magnetic-microwave. Typically, in the magnetic-optical sensor the magnetic portion is used to accurately locate the center of the target to trigger the warhead, but it is somewhat susceptible to false alarms due primarily to nearby power lines. To reduce this probability, an optical sensor is used to detect the presence of objects within the warhead damage zone beneath the missile, typically selected to be within 15 feet below. The magnetic sensor is inhibited from firing the warhead unless both the magnetic sensor and the optical sensor detect the presence of an object in the target zone.

For only a single optical sensor system in a missile 10 shown in FIG. 3, a transmitted beam 18 is aligned so that it crosses a receiver field of view 22 creating a window or sensing zone 24. If a reflective object passes through sensing zone 24, the reflected light of the transmitted beam is sensed by the receiver. If the optically impinged portion of an object passes above or below the sensing zone, the reflected light is outside the receiver field of view and is not sensed.

While this single sensor approach has worked reasonably well, over certain types of terrain and/or vegetation a double reflection occurence can cause false alarms in the optical sensor, reducing its effectiveness. Certain surfaces 51 such as deep grass terrain, even though totally below the sensing zone 24, can reflect transmitted beam light rays 52 so that some rays 52A enter the receiver field of view 22, where they can again reflect 54 up into a receiver, causing a false alarm.

SUMMARY OF THE INVENTION

The dual field-of-view optical target detector allows a vehicle such as a missile or projectile to fly by and sense a target while providing superior false alarm rejection from reflecting terrain. An optical transmitter on the missile is aimed to direct a beam of energy into a region near a side of the missile. The receiver has two separate look axes which intersect the beam in close proximity to the side or surface of the missile, forming a pair of adjacent sensing zones. The distances below the missile where the two sensing zones or windows are located may be adjusted by changing the transmit axis and look axes so that the windows may be positioned either very close to or relatively distant from the missile. When a target such as a tank enters the first established window space, energy is reflected to the receiver. The second window allows undesirable background reflection to be separately detected and compared with the target data for eliminating false alarms. Subsequently, a target presence or enabling output to allow triggering of a warhead can be initiated.

DESCRIPTION OF THE PREFERRED EMBODIMENT

Figure 1:
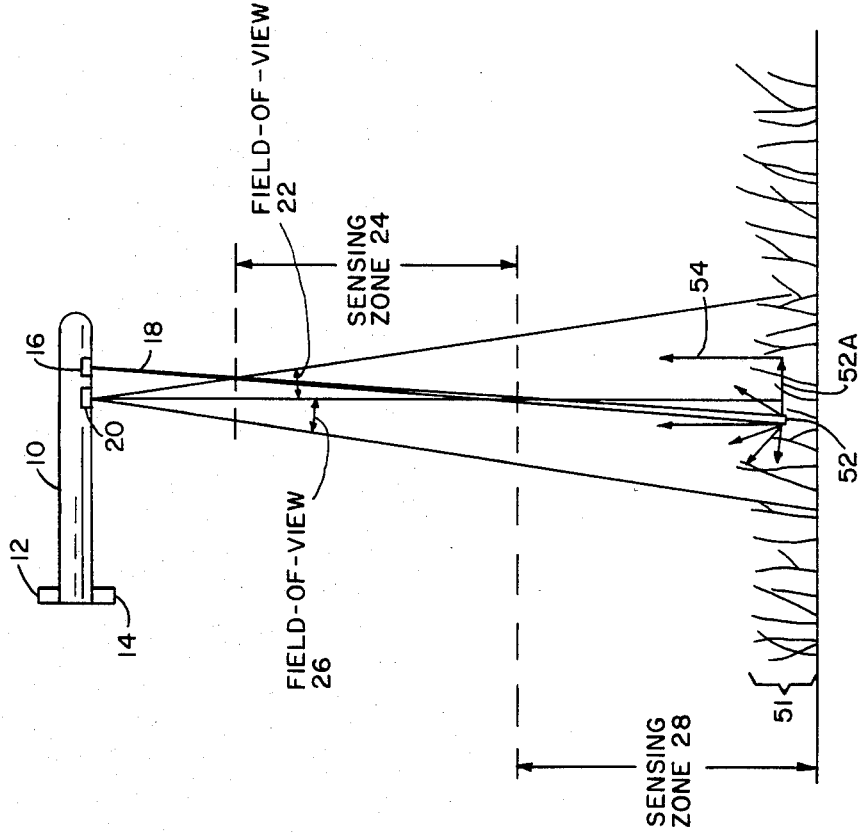
FIG. 1 is a diagram of a preferred embodiment disclosing dual field-of-view detection utilized in a missile.

Referring now to the drawings wherein like numbers represent like parts in each Figure, FIG. 1 is a drawing of a missile 10 employing dual field-of-view optical detection. Missile 10 is roll stabilized by fins 12 and 14. An optical transmitter 16 such as a laser with beam forming optics is located for directing a well-defined optical beam 18 downward at a selectable angle from the missile. An optical receiver 20 is mounted for providing a first well-defined field-of-view 22 downward and at a selectable angle to the missile so that the field-of-view 22 intersects the transmitted optical beam 18 in close proximity to the side of the missile. The volume of space where the beam 18 is coincident with the field-of-view 22 creates a sensing zone or window 24 beneath the missile. Typically, the beam axis for beam 18 and the look axis for field-of-view 22 may intersect and lie in a plane passing through the missile longitudinal axis, with the transmitter and receiver adapted for pivotal or rotational movement to position the intersection point of the beam axis and the look axis at both an adjustable distance from the missile and at an adjustable point toward the front or rear of the missile. Accordingly, the particular location of the transmitter and the receiver may be conveniently placed to accomplish this.

Similar to the first field-of-view, a second field-of-view 26 is directed adjacent to field-of-view 22 on the rear or aft side thereof, providing a sensing zone 28. Zone 28 allows reflected energy from background to be detected and compared with energy received in field-of-view 22.

Figure 2:
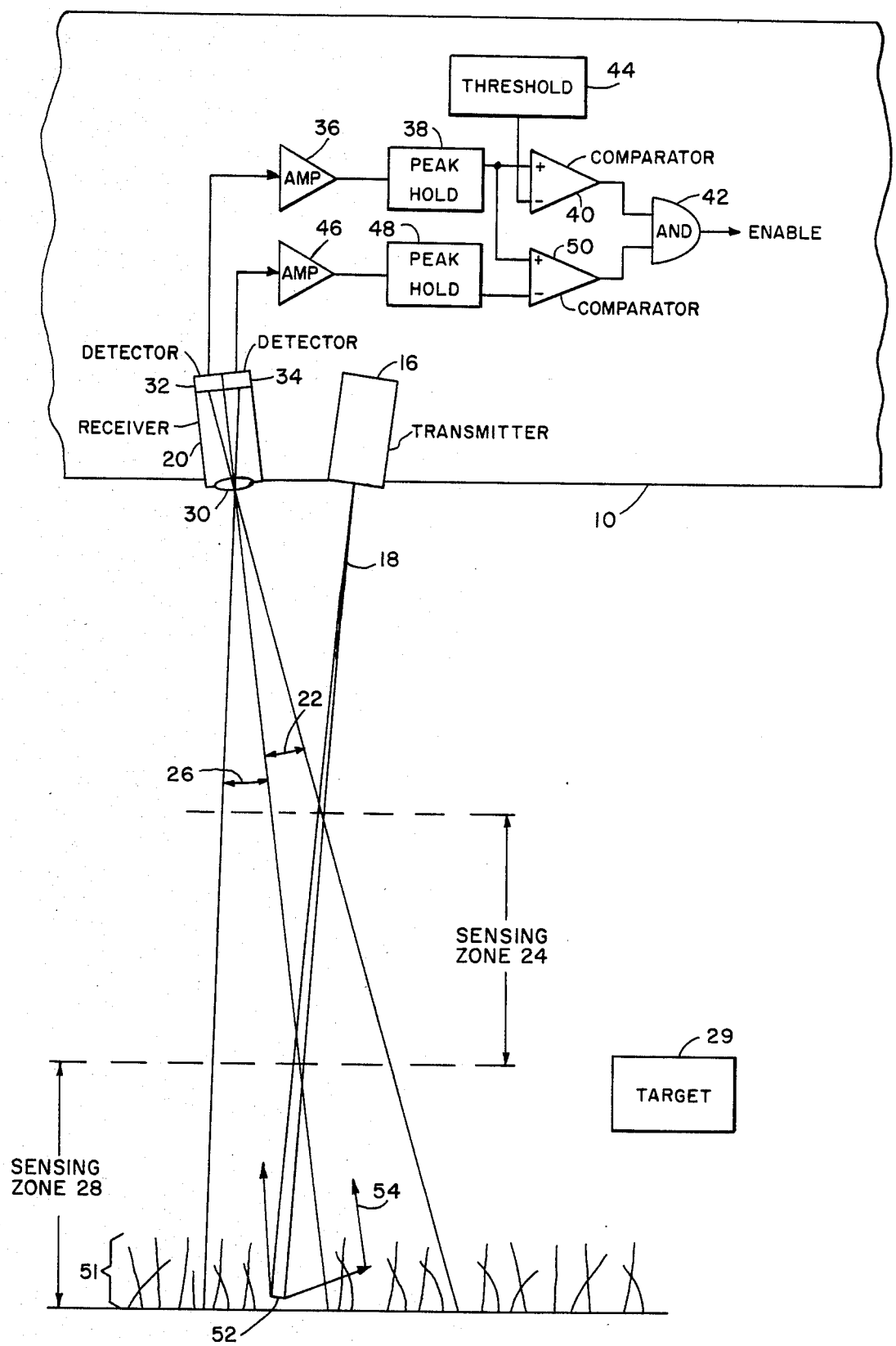
FIG. 2 is a block diagram of a transmitter-receiver system for providing the dual field-of-view detection.

FIG. 2 is a block diagram of a transmitter-receiver circuit for establishing the sensitive window, zone 24, and sensing zone 28. Receiver 20 comprises optics 30 and adjacent optical detectors 32 and 34 for converting the optical input signals into electrical outputs.

Electrical signal processing combines the outputs of detectors 32 and 34 to provide a trigger or enable signal to fire the warhead of the missile into a target 29 passing within window 24. The output of detector 32 is processed sequentially through an amplifier 36, a peak hold circuit 38 and a comparator 40 to an AND gate 42. A threshold circuit 44 provides an additional input to comparator 40 for comparing with the target signal output from peak holding circuit 38. When the threshold level is exceeded by the target signal input, an output from comparator 40 to gate 42 indicates that the received signal intensity level from window 24 is of sufficient strength to indicate presence of a true target.

The output of detector 34 is similarly processed sequentially through an amplifier 46, peak hold circuit 48, and comparator 50 to another input of AND gate 42. Comparator 50 also receives an input from the output of peak hold circuit 38—the output of circuit 38 (the true target signal) being coupled to the positive inputs of both comparators. AND gate 42 provides the enable output.

In operation, the sensing zones are established immediately after launch or system response is otherwise delayed so that a trigger signal is not generated during launch, as is routine procedure. The missile is caused to fly just over the top of the intended target. A nominal target surface distance from the missile receiver is 15 feet or less. Typically, missile 10 is launched from a ground or vehicle mounted launcher and flys an elevated flight path to the target. The triggering window 24 is maintained above ground during flight. When the missile flys over the target, the target's upper surfaces enter the window causing a reflected return of the transmitter energy in field-of-view 22, which is sensed by the receiver, and processed by the receiver electronics in preparaion for initiating a trigger pulse to enable firing a warhead. The receiver can be optically filtered and tuned to detect reflected transmitter energy from any object that might enter the sensitive window 24. Ideally, for objects outside window 24 no return energy would be sensed. Actually, however, due to doubly reflected rays from some surrounding background below and adjacent the window, various levels of undesired radiation can be sensed in field-of-view 22 even though no object is in the window. These reflected rays can also add to desirable signals picked up when an object does enter window 24. This can result in the output signal from detector 32 and peak hold circuit 38 being of a sufficient level to exceed the comparator bias provided by threshold 44. This additional, variable, signal level is undesirable and is considered as noise. The detector 34 circuit and field-of-view 26 eliminate undesirable triggering. Since field-of-view 26 is immediately adjacent field-of-view 22, as the transmitted beam leaves 22 it enters 26. Over problem causing terrain, some rays will still doubly reflect into field-of-view 22, but even more will usually singly reflect into field-of-view 26 and be detected by detector 34.

Signals from detectors 32 and 34 are similarly amplified and converted to DC levels (peak held). The detector 32 signal is compared to a fixed threshold as noted. However, it is also compared to the detector 34 output signal. The two comparator outputs are then "anded" to achieve the optical enable signal output. Therefore the return from the primary sensing zone detector 32 must be not only greater than the threshold but must also be greater than the return from detector 34 to indicate target presence, substantially rejecting doubly reflected false alarms. The electronic functions can also be performed by microprocessor software to achieve the enable output.

The signal detected by detector 32 may include both strong target reflected energy and doubly reflected rays (noise). The signal detected by detector 34 will include only singly and doubly reflected rays from terrain 51. When the signal output from detector 34 is zero or negligible, and the positive input from detector 32 to comparator 40 exceeds the threshold biasing signal, the detector 32 output to comparator 50 is also greater than the detector 34 output which allows an enable output from gate 42 to indicate presence of a target in window 24. The presence of a target in window 24 will always result in a stronger signal in the target detector 32 than the scattered, reflected rays 52 from terrain 51 entering detector 34. However, even with no or limited signal detection by detector 32, and a strong or excessive signal detected by detector 34, the system will not send a false fire or enable pulse since the (−) inputs to comparators 40 and 50 are controlling.

It is obvious that a condition could occur where noise or doubly reflected rays from field-of-view 26 directed into field-of-view 22 could be of a target intensity level with no target present in window 24 and therefore exceed threshold 44, for a low threshold setting. However, as has been noted the single and doubly reflected rays 52 and 54 occuring in field-of-view 26 and reflected to detector 34 will far exceed those doubly reflected to detector 32. This will result in the comparison at comparator 50 with the stronger (−) input from detector 34 preventing a firing signal. Thus false alarm or false firing is prevented while a detected target signal from detector 32 must simultaneously exceed both a preset threshold and a variable, spontaneous, noise or background signal.

Figure 3:
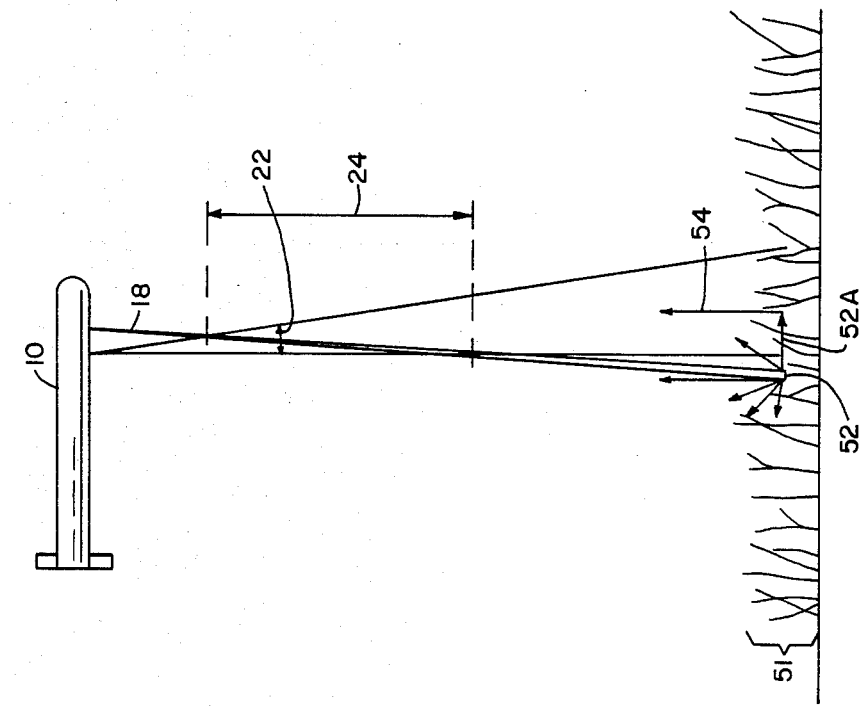
FIG. 3 is a drawing showing missile flyby over doubly reflective terrain and incorporating only a single sensing window.

The dual field-of-view detection will activate on nonoperating vehicles and can also be used against nonmetal targets such as bunkers or pill boxes. It can sense any target that protrudes above the normal ground plane. The system will accommodate a variety of stand-off distance requirements and uncertainties in missile flight paths by simply adjusting the field-of-view, beam width, power, lookdown angles, etc., to form the triggering window's desired size and location below the missile. The threshold 44, which wuld have to be set well above system noise for a single detector system such as FIG. 3 or for a combination system such as magnetic-optical, can be set much lower due to the dual field-of-view sensing and thereby provide both increased sensitivity and false target rejection. While separate and distinct detectors 32 and 34 may be mounted in alignment to provide the two immediately adjacent fields-of-view, alignment problems are eliminated by using a bifurcated detector such as the SGD 444-2 manufactured by EG and G Corporation.

While the invention has been described in connection with a specific embodiment thereof, it will be understood that modifications and variations will suggest themselves to those skilled in the art. Accordingly, the invention is intended to cover such modifications that fall witin the scope of the claims appended hereto.

I claim:

1. A dual field-of-view detection system comprising: a receiver having first and second detecting means therein disposed to provide respective adjacent directional fields-of-view for receiving reflected electromagnetic radiation, a transmitter for directing electromagnetic radiation into the fields-of-view of said receiver detection means for establishing first and second sensing zones where the respective fields-of-view and the transmitted radiation are coincident, and comparison means coupled to said first and second detection means for comparing reflected radiation from said first and second sensing zones as detected by said first and second detection means to provide an output signal when the radiation sensed by the first detection means exceeds both a predetermined bias level and the radiation sensed by the second detection means.

2. A dual field-of-view detection system as set forth in clam 1 wherein said first and second detection means are a bifurcated detector having first and second separate and distinct outputs indicative of reflected radiation present within the respective fields-of-view.

3. A dual field-of-view detection system as set forth in claim 2 wherein said electromagnetic radiation is optical radiation and said first sensing zone is established in closer proximity to said receiver than said second sensing zone.

4. A dual field-of-view detection system as set forth in claim 3 and further comprising a vehicle, said receiver and said transmitter being mounted on said vehicle and being spaced apart for establishing said first sensing zone in close proximity to the surface of said vehicle.

5. In a missile system wherein a missile is directed to fly by a target, a dual field-of-view target presence detection method for providing an enable or activate output signal, and comprising the steps of:

directing said missile to fly by the target in close proximity thereto;

establishing a first electromagnetic radiation sensing zone external of and adjacent to the surface of said missile prior to flyby;

establishing a second electromagnetic radiation sensing zone immediately adjacent said first zone and spaced apart from said missile by at least the boundary of said first zone;

initiating a trigger signal in said missile in response to reflected radiation detected in said zones when detected radiation in the first zone exceeds that detected in the second zone; and comparing radiation sensed in said first sensing zone with a predetermined threshold level and with radiation sensed in said second sensing zone prior to initiating said trigger signal.

6. In a missile system, a dual field-of-view target presence detection method as set forth in clam 5, and further comprising the steps of:

detecting reflected radiation in the first sensing zone indicative of presence or absence of a target in the zone; and detecting reflected radiation in the second sensing zone indicative of extraneous radiation reflection for initiating the trigger signal in said missle.

* * * * *